(12) United States Patent
Serletic, II et al.

(10) Patent No.: US 9,570,055 B2
(45) Date of Patent: Feb. 14, 2017

(54) SYSTEM AND METHOD FOR AUTOMATICALLY CONVERTING TEXTUAL MESSAGES TO MUSICAL COMPOSITIONS

(71) Applicant: ZYA, INC., Calabasas, CA (US)

(72) Inventors: Matthew Michael Serletic, II, Calabasas, CA (US); Bo Bazylevsky, Calabasas, CA (US); James Mitchell, Calabasas, CA (US); Ricky Kovac, Calabasas, CA (US); Patrick Woodward, Calabasas, CA (US); Thomas Webb, Calabasas, CA (US); Ryan Groves, Montreal (CA)

(73) Assignee: ZYA, INC., Calabasas, CA (US)

( * ) Notice: Subject to any disclaimer, the term of this patent is extended or adjusted under 35 U.S.C. 154(b) by 0 days.

(21) Appl. No.: 14/834,187

(22) Filed: Aug. 24, 2015

(65) Prior Publication Data

US 2016/0055838 A1    Feb. 25, 2016

Related U.S. Application Data

(60) Provisional application No. 62/040,842, filed on Aug. 22, 2014, provisional application No. 62/121,803, filed on Feb. 27, 2015.

(51) Int. Cl.
*G10L 13/08*    (2013.01)
*G10L 21/00*    (2013.01)
(Continued)

(52) U.S. Cl.
CPC ........... *G10H 1/0025* (2013.01); *G10L 13/027* (2013.01); *G10L 25/48* (2013.01);
(Continued)

(58) Field of Classification Search
CPC ........ G10L 13/00; G10L 25/48; G10L 13/033; G10L 13/02; G10L 13/027; G10L 13/047; G10L 15/22; G10L 2015/025; G10L 21/003; G10L 25/00; G10L 25/81; G10L 25/90; G10H 2250/455; G10H 1/361; G10H 1/0066; G10H 2230/015; G10H 2250/481
(Continued)

(56) References Cited

U.S. PATENT DOCUMENTS 6,424,944 B1    7/2002 Hikawa
2003/0009336 A1*    1/2003 Kenmochi .............. G10L 13/07
                                                    704/258

(Continued)

OTHER PUBLICATIONS

PCT; International Search Report and Written Opinion Issued on Dec. 7, 2015 in corresponding PCT/US15/46584; 8 pages.

*Primary Examiner* — Marivelisse Santiago Cordero
*Assistant Examiner* — Stephen Brinich
(74) *Attorney, Agent, or Firm* — Loeb & Loeb LLP

(57) ABSTRACT

A method for converting textual messages to musical messages comprising receiving a text input and receiving a musical input selection. The method includes analyzing the text input to determine text characteristics and analyzing a musical input corresponding to the musical input selection to determine musical characteristics. Based on the text characteristic and the musical characteristic, the method includes correlating the text input with the musical input to generate a synthesizer input, and sending the synthesizer input to a voice synthesizer. The method includes receiving a vocal rendering of the text input from the voice synthesizer, generating a musical message from the vocal rendering and the musical input, and outputting the musical message.

18 Claims, 4 Drawing Sheets

(51) Int. Cl.
*G10H 1/00* (2006.01)
*G10L 13/027* (2013.01)
*G10L 25/48* (2013.01)

(52) U.S. Cl.
CPC . *G10H 2220/106* (2013.01); *G10H 2240/085* (2013.01); *G10H 2240/131* (2013.01); *G10H 2250/455* (2013.01)

(58) Field of Classification Search
USPC ...... 704/1–10, 200–201, 258, 266–270, 272, 704/275, 278, E13.004
See application file for complete search history.

(56) References Cited

U.S. PATENT DOCUMENTS

| | | | |
|---|---|---|---|
| 2006/0156909 A1* | 7/2006 | Kobayashi | G10H 1/0066 84/645 |
| 2008/0070605 A1 | 3/2008 | Kim | |
| 2011/0066940 A1 | 3/2011 | Asghari Kamrani et al. | |

* cited by examiner

SYSTEM AND METHOD FOR AUTOMATICALLY CONVERTING TEXTUAL MESSAGES TO MUSICAL COMPOSITIONS

CROSS-REFERENCE TO RELATED APPLICATIONS

This application claims priority to U.S. Provisional Patent Application No. 62/040,842, filed Aug. 22, 2014, and U.S. Provisional Patent Application No. 62/121,803, filed Feb. 27, 2015, both of which are incorporated by reference in their entirety herein.

TECHNICAL FIELD

The present disclosure relates generally to the field of music creation, and more specifically to a system of converting text to a musical composition.

BACKGROUND

Communication via written text has become commonplace in today's society. Such textual communications may be transmitted (or otherwise made available) to one or more recipients via email, MMS message, SMS message, instant messaging, online chat, various social media outlets such as Twitter® and Facebook® messaging, among other methods available now and in the future.

As text communication has become more ubiquitous over time, this form of messaging has lost some of its original appeal. Some text communication applications have introduced additional features in attempt to reclaim some of the appeal. For example, certain text platforms allow users to add emoticons or other graphics (e.g. GIF files) to their messages. Even so, because of their growingly pervasive use, graphics have lost some of their appeal as well over time. Moreover, the number of pre-existing graphics and emoticons are practically limited, and creating such graphical enhancements from scratch may be difficult or impractical for the common user. Similarly, some applications have provided users with limited options for embedding audio/music files into messages transmitted using certain formats.

It would be desirable to provide users with a convenient platform to compose and deliver text-based communication over various mediums in a more creative and entertaining manner.

SUMMARY

In an embodiment, the disclosure describes a computer implemented method for automatically converting textual messages to musical messages. The computer implemented method comprises receiving a text input and receiving a musical input selection. The method also includes analyzing, via one or more processors, the text input to determine at least one text characteristic of the text input and analyzing, via the one or more processors, a musical input corresponding to the musical input selection to determine at least one musical characteristic of the musical input. Based on the at least one text characteristic and the at least one musical characteristic, the method also includes correlating, via the one or more processors, the text input with the musical input to generate a synthesizer input and sending the synthesizer input to a voice synthesizer. The method includes receiving, from the voice synthesizer, a vocal rendering of the text input, generating a musical message from the vocal rendering of the text input and the musical input, outputting the musical message.

In another embodiment, the disclosure describes an apparatus comprising at least one processor and at least one memory storing computer readable instructions. When executed, the instructions cause the apparatus at least to perform receiving a text input and receiving a musical input selection. The instructions also cause the apparatus to perform analyzing, via the at least one processor, the text input to determine at least one text characteristic of the text input and analyzing, via the at least one processor, a musical input corresponding to the musical input selection to determine at least one musical characteristic of the musical input. Based on the at least one text characteristic and the at least one musical characteristic, the instructions also cause the apparatus to perform correlating, via the at least one processor, the text input with the musical input to generate a synthesizer input and sending the synthesizer input to a voice synthesizer. The instructions also cause the apparatus to perform receiving, from the voice synthesizer, a vocal rendering of the text input, generating a musical message from the vocal rendering of the text input and the musical input, and outputting the musical message.

In another embodiment, the disclosure describes a non-transitory computer readable medium storing instructions that, when executed, cause an apparatus at least to perform receiving a text input and receiving a musical input selection. The instructions also cause the apparatus to perform analyzing, via one or more processors, the text input to determine at least one text characteristic of the text input and analyzing, via the one or more processors, a musical input corresponding to the musical input selection to determine at least one musical characteristic of the musical input. Based on the at least one text characteristic and the at least one musical characteristic, the instructions also cause the apparatus to perform correlating, via the one or more processors, the text input with the musical input to generate a synthesizer input and sending the synthesizer input to a voice synthesizer. The instructions also cause the apparatus to perform receiving, from the voice synthesizer, a vocal rendering of the text input, generating a musical message from the vocal rendering of the text input and the musical input, and outputting the musical message.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein.

DETAILED DESCRIPTION

Figure 1:
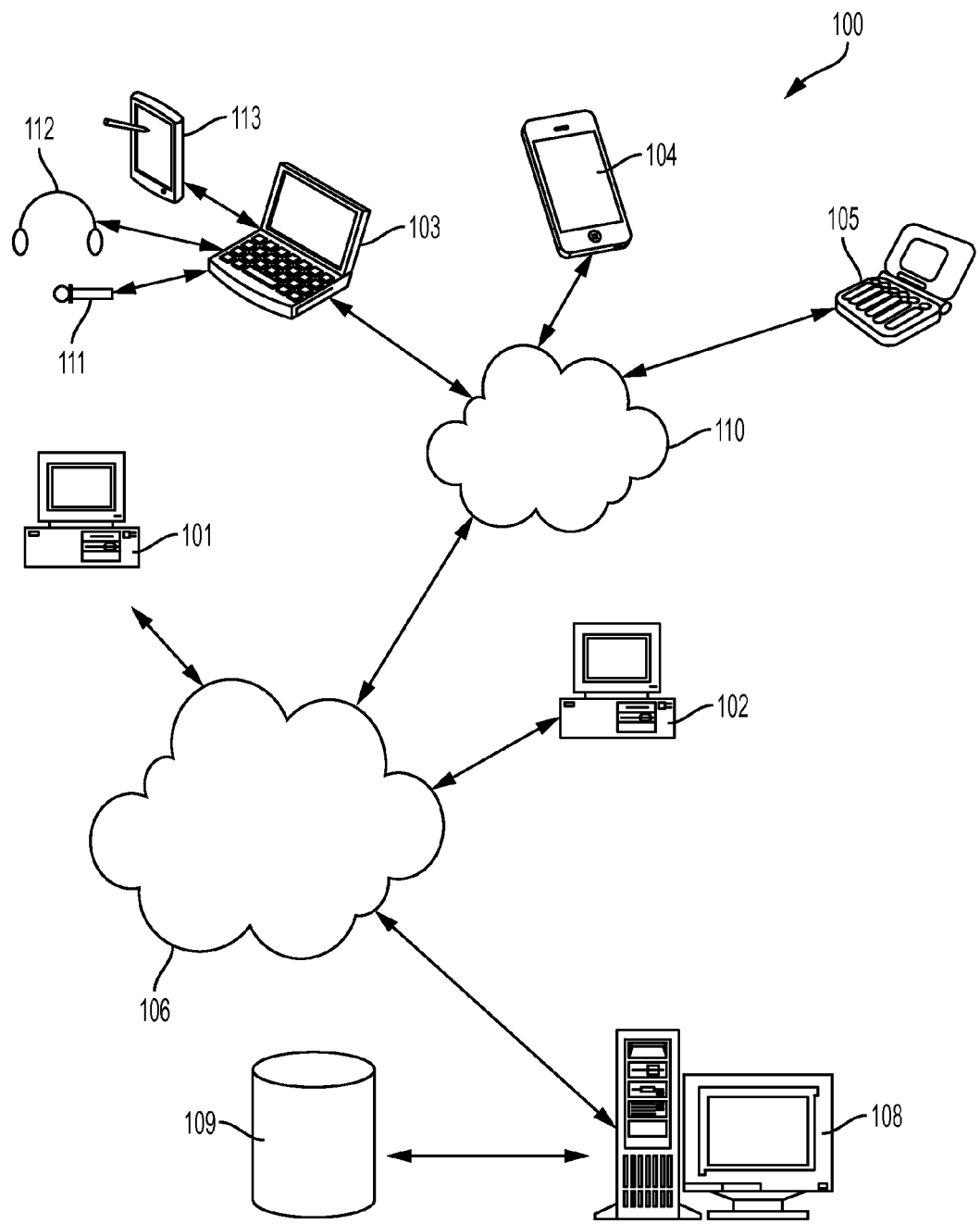
FIG. 1 illustrates one exemplary embodiment of a network configuration in which a musical messaging system may be practiced in accordance with the disclosure.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

The present disclosure relates to a system and method for creating a message containing an audible musical and/or video composition that can be transmitted to users via a variety of messaging formats, such as SMS, MMS, and e-mail. It may also be possible to send such musical composition messages via various social media platforms and formats, such as Twitter®, Facebook®, Instagram®, or any other suitable media sharing system. In certain embodiments, the disclosed musical messaging system provides users with an intuitive and convenient way to automatically create and send original works based on infinitely varied user inputs. For example, the disclosed musical messaging system can receive textual input from a user in the form of a text chain, along with the user's selection of a musical work or melody that is pre-recorded or recorded and provided by the user. Once these inputs are received, the musical messaging system can analyze and parse both the text chain and the selected musical work to create a vocal rendering of the text chain paired with a version of the musical work to provide a musically-enhanced version of the text input by the user. The output of the musical messaging system can provide a substantial variety of musical output while maintaining user recognition of the selected musical work. The user can then, if it chooses, share the musical message with others via social media, SMS or MMS messaging, or any other form of file sharing or electronic communication.

In some embodiments, the user can additionally record video to accompany the musically enhanced text. The video can be recorded in real-time along with a vocal rendering of the text input provided by the user in order to effectively match the video to the musical message created by the system. In other embodiments, pre-recorded video can be selected and matched to the musical message. The result of the system, in such embodiments, is an original lyric video created using only a client device such as a smartphone or tablet connected to a server via a network, and requiring little or no specialized technical skills or knowledge. The musical messaging system and methods of implementing such a system are described in more detail below.

FIG. 1 illustrates an exemplary embodiment of a network configuration in which the disclosed musical messaging system 100 can be implemented. It is contemplated herein, however, that not all of the illustrated components may be required to implement the musical messaging system, and that variations in the arrangement and types of components can be made without departing from the spirit of the scope of the invention. Referring to FIG. 1, the illustrated embodiment of the musical messaging system 100 includes local area networks ("LANs")/wide area networks ("WANs") (collectively network 106), wireless network 110, client devices 101-105, server 108, media database 109, and peripheral input/output (I/O) devices 111, 112, and 113. While several examples of client devices are illustrated, it is contemplated herein that client devices 101-105 may include virtually any computing device capable of processing and sending audio, video, or textual data over a network, such as network 106, wireless network 110, etc. In some embodiments, one or both of the wireless network 110 and the network 106 can be a digital communications network. Client devices 101-105 may also include devices that are configured to be portable. Thus, client devices 101-105 may include virtually any portable computing device capable of connecting to another computing device and receiving information. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like.

Client devices 101-105 may also include virtually any computing device capable of communicating over a network to send and receive information, including track information and social networking information, performing audibly generated track search queries, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 101-105 may operate over wired and/or wireless network.

A client device 101-105 can be web-enabled and may include a browser application that is configured to receive and to send web pages, web-based messages, and the like. The browser application may be configured to receive and display graphics, text, multimedia, video, etc., and can employ virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized 25 Markup Language (SMGL), HyperText Markup Language (HTML), eXtensible Markup Language (XML), and the like, to display and send various content. In one embodiment, a user of the client device may employ the browser application to interact with a messaging client, such as a text messaging client, an email client, or the like, to send and/or receive messages.

Client devices 101-105 also may include at least one other client application that is configured to receive content from another computing device. The client application may include a capability to provide and receive multimedia content, such as textual content, graphical content, audio content, video content, etc. The client application may further provide information that identifies itself, including a type, capability, name, and the like. In one embodiment, client devices 101-105 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in, for example, a network packet or other suitable form, sent to server 108, or other computing devices. The media database 109 may be configured to store various media such as musical clips and files, etc., and the information stored in the media database may be accessed by the server 108 or, in other embodiments, accessed directly by other computing device through over the network 106 or wireless network 110.

Client devices 101-105 may further be configured to include a client application that enables the end-user to log into a user account that may be managed by another computing device, such as server 108. Such a user account, for example, may be configured to enable the end-user to participate in one or more social networking activities, such as submit a track or a multi-track recording or video, search for tracks or recordings, download a multimedia track or other recording, and participate in an online music community. However, participation in various networking activities may also be performed without logging into the user account.

Wireless network 110 is configured to couple client devices 103-105 and its components with network 106. Wireless network 110 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. Wireless network 110 may further include an autonomous system of terminals, gateways, routers, etc., connected by wireless radio links, or other suitable wireless communication protocols. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation, and 4G Long Term Evolution (LTE) radio access for cellular systems, WLAN, Wireless Router (WR) mesh, and other suitable access technologies. Access technologies such as 2G, 3G, 4G, 4G LTE, and future access networks may enable wide area coverage for mobile devices, such as client devices 103-105 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), etc. In essence, wireless network 110 may include virtually any wireless communication mechanism by which information may travel between client devices 103-105 and another computing device, network, and the like.

Network 106 is configured to couple network devices with other computing devices, including, server 108, client devices 101-102, and through wireless network 110 to client devices 103-105. Network 106 is enabled to employ any form of computer readable media for communicating information from one electronic device to another. Also, network 106 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 106 includes any communication method by which information may travel between computing devices.

In certain embodiments, client devices 101-105 may directly communicate, for example, using a peer to peer configuration.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Various peripherals, including I/O devices 111-113 may be attached to client devices 101-105. For example, Multi-touch, pressure pad 113 may receive physical inputs from a user and be distributed as a USB peripheral, although not limited to USB, and other interface protocols may also be used, including but not limited to ZIGBEE, BLUETOOTH, or other suitable connections. Data transported over an external and the interface protocol of pressure pad 113 may include, for example, MIDI formatted data, though data of other formats may be conveyed over this connection as well. A similar pressure pad may alternately be bodily integrated with a client device, such as mobile devices 104 or 105. A headset 112 may be attached to an audio port or other wired or wireless I/O interface of a client device, providing an exemplary arrangement for a user to listen to playback of a composed message, along with other audible outputs of the system. Microphone 111 may be attached to a client device 101-105 via an audio input port or other connection as well. Alternately, or in addition to headset 112 and microphone 111, one or more speakers and/or microphones may be integrated into one or more of the client devices 101-105 or other peripheral devices 111-113. Also, an external device may be connected to pressure pad 113 and/or client devices 101-105 to provide an external source of sound samples, waveforms, signals, or other musical inputs that can be reproduced by external control. Such an external device may be a MIDI device to which a client device 103 and/or pressure pad 113 may route MIDI events or other data in order to trigger the playback of audio from external device. However, it is contemplated that formats other than MIDI may be employed by such an external device.

Figure 2:
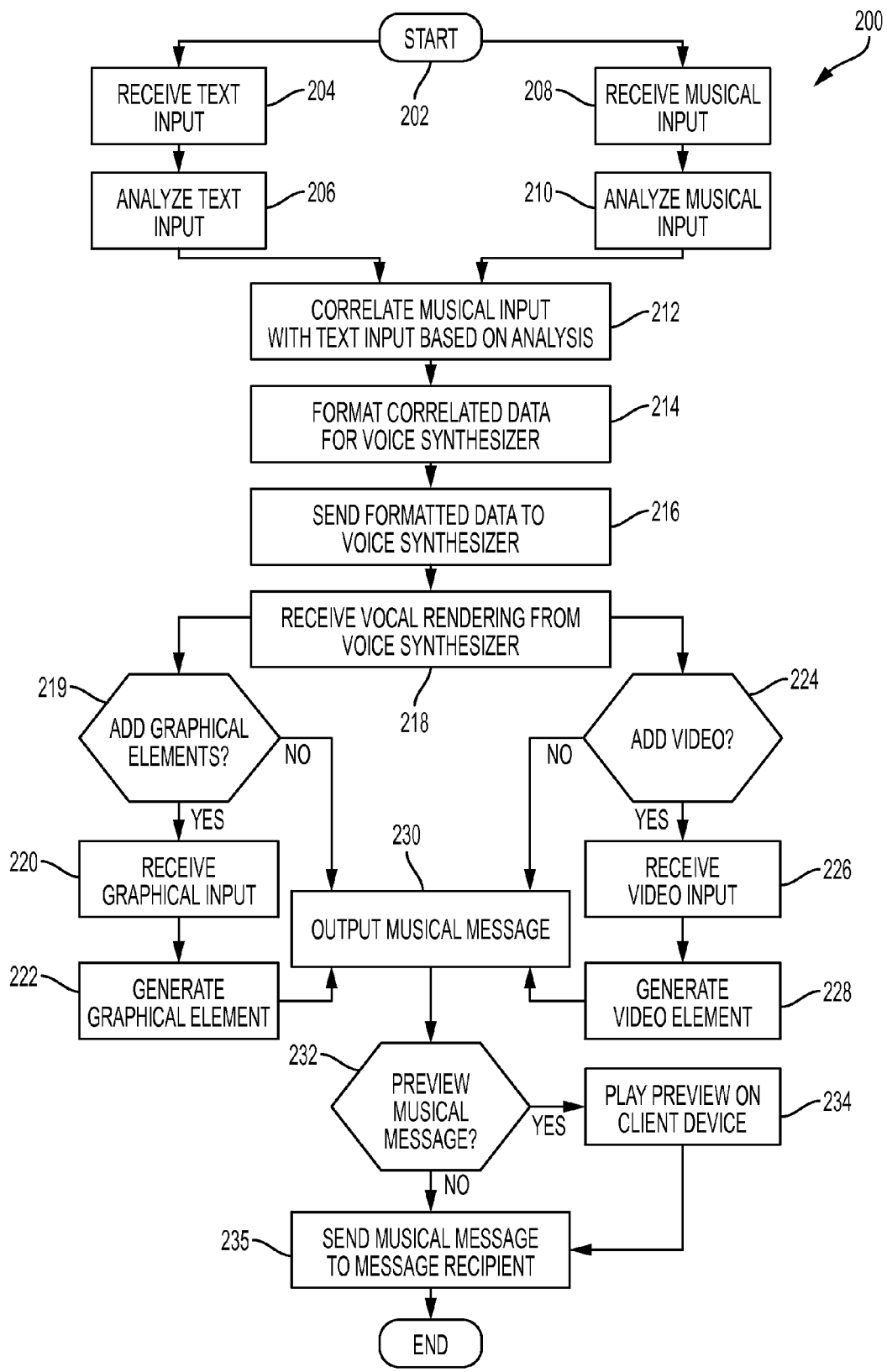
FIG. 2 illustrates a flow diagram of an embodiment of a method of operating the a musical messaging system in accordance with the disclosure.

FIG. 2 is a flow diagram illustrating an embodiment of a method 200 for operating the musical messaging system 100, with references made to the components shown in FIG. 1. Beginning at 202, the system can receive a text input at 204. The text input for a message a user desires to send can be input by the user via an electronic device, such as a PC, tablet, or smartphone, any other of the client devices 101-105 described in reference to FIG. 1 or other suitable devices. The text may be input in the usual fashion in any of these devices (e.g., manual input using soft or mechanical keyboards, touch-screen keyboards, speech-to-text conversion). In some embodiments, the text input is provided through a specialized user interface application accessed using the client device 101-105. Alternatively, the text input could be delivered via a general application for transmitting text-based messages using the client device 101-105.

The resulting text input may be transmitted over the wireless communications network 110 and/or network 106 to be received by the server 108 at 204. At 206, the system analyzes the text input using server 108 to determine certain characteristics of the text input. In some embodiments, however, it is contemplated that analysis of the text message could alternatively take place on the client device 101-105 itself instead of or in parallel to the server 108. Analysis of the text input can include a variety of data processing techniques and procedures. For example, in some embodiments, the text input is parsed into the speech elements of the text with a speech parser. For instance, in some embodiments, the speech parser may identify important words (e.g., love, anger, crazy), demarcate phrase boundaries (e.g., "I miss you." "I love you." "Let's meet." "That was an awesome concert.") and/or identify slang terms (e.g., chill, hang). Words considered as important can vary by region or language, and can be updated over time to coincide with the contemporary culture. Similarly, slang terms can vary geographically and temporally such that the musical messaging system 100 is updatable and customizable. Punctuation or other symbols used in the text input can also be identified and attributed to certain moods or tones that can influence the analytical parsing of the text. For example, an exclamation point could indicate happiness or urgency, while a "sad-face" emoticon could indicate sadness or sorrow. In some embodiments, the message conveyed in the text input can also be processed into its component pieces by breaking words down into syllables, and further by breaking the syllables into a series of phonemes. In some embodiments, the phonemes are used to create audio playback of the message in the text input. Additional techniques used to analyze the text input are described in greater detail below.

At 208, the system receives a selection of a musical input transmitted from the client device 101-105. In some embodiments, a user interface can be implemented to select the musical input from a list or library of pre-recorded and catalogued musical works or clips of musical works that can comprise one or more musical phrases. In this context, a musical phrase is a grouping of musical notes or connected sounds that exhibits a complete musical "thought," analogous to a linguistic phrase or sentence. To facilitate the user's choice between pre-recorded musical works or phrases, the list of available musical works or phrase may include, for example, a text-based description of the song title, performing artists, genre, and/or mood set by phrase, to name only a few possible pieces of information that could be provided to users via the user interface. Based on the list of available musical works or phrases, the user may then choose the desired musical work or clip for the musical messaging system to combine with the text input. In one embodiment, there may be twenty or more pre-recorded and selected musical phrases for the user to choose from.

In some embodiments, the pre-recorded musical works or phrases are stored on the server 108 or media database 109 in any suitable computer readable format, and accessed via the client device 101-105 through the wireless network 106 and/or network 110. Alternatively, in other embodiments, the pre-recorded musical works are stored directly onto the client device 101-105 or another local memory device, such as a flash drive or other computer memory device. Regardless of the storage location, the list of pre-recorded musical works can be updated over time, removing or adding musical works in order to provide the user with new options and additional choices.

It is also contemplated that individual users may create their own melodies for use in association with the musical messaging system. One or more melodies may be created using the technology disclosed in U.S. Pat. No. 8,779,268 entitled "System and Method for Producing a More Harmonious Musical Accompaniment Graphical User Interface for a Display Screen System and Method that Ensures Harmonious Musical Accompaniment" assigned to the assignee of the present application. Such patent disclosure is hereby incorporated by reference, in full.

In further embodiments, individual entries in the list of musical input options are selectable to provide, via the client device 101-105, a pre-recorded musical work, or a clip thereof, as a preview to the user. In such embodiments, the user interface associated with selecting a musical work includes audio playback capabilities to allow the user to listen to the musical clip in association with their selection of one of the musical works as the musical input. In some embodiments, such playback capability may be associated with a playback slider bar that graphically depicts the progressing playback of the musical work or clip. Whether the user selects the melody from the pre-recorded musical works stored within the system or from one or more melodies created by the user, it is contemplated that the user can be provided with functionality to select the points to begin and end within the musical work to define the musical input.

Figure 3:
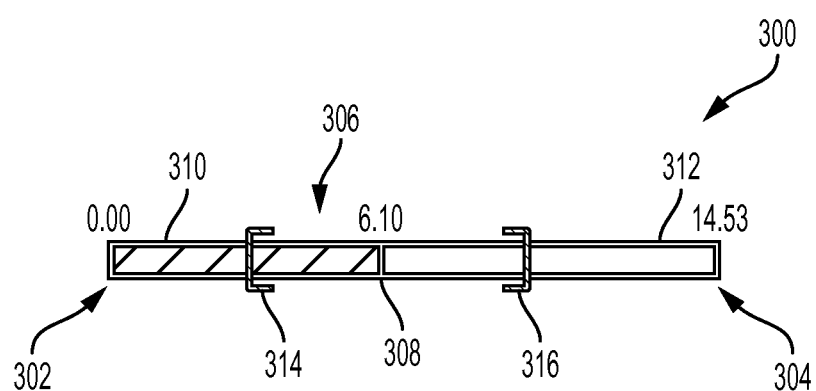
FIG. 3 illustrates an embodiment of a playback slider bar in accordance with the disclosure.

One illustrative example of a playback slider bar 300 is shown in FIG. 3. The illustrated playback slider bar 300 includes a start 302, an end 304, and a progress bar 306 disposed between the start and end. It should be understood, however, that other suitable configurations are contemplated in other embodiments. In the embodiment illustrated in FIG. 3, the total length of the selected musical work or clip is 14.53 seconds, as shown at the end 304, though it should be understood that any suitable length of musical work or clip is contemplated. As the selected music progresses through playback, a progress indicator 308 moves across the progress bar 306 from the start 302 to end 304. In the illustrated embodiment, the progress bar "fills in" as the progress indicator 308 moves across, resulting in a played portion 310 disposed between the start 302 and the progress indicator and an unplayed portion 312 disposed between the progress indicator and the end 304 of the musical clip. In the embodiment illustrated in FIG. 3, the progress indicator 308 has progressed across the progress bar 306 to the 6.10 second mark in the selected musical clip. Although the embodiment illustrated in FIG. 3 shows the progress bar 306 being filled in as the progress indicator 308 moves across it, other suitable mechanisms for indicating playback progress of a musical work or clip are also contemplated herein.

In some embodiments, such as the embodiment illustrated in FIG. 3, the user can place brackets, such as a first bracket 314 and a second bracket 316, around a subset of the selected musical phrase/melody along the progress bar 306. The brackets 314, 316 indicate the portions of the musical work or clip to be utilized as the musical input at 208 in FIG. 2. For example, the first bracket 314 can indicate the "start" point for the selected musical input, and the second bracket 316 can indicate the "end" point. Other potential user interfaces that may facilitate user playback and selection of a subset of the musical phrase may be used instead of or in conjunction with the embodiment of the playback slider bar 300 of FIG. 3.

As would be understood by those in the art having the present specification before them, it would be possible for the user to select a musical work, phrase, or melody first and then later input their desired text, or vice versa, while still capturing the essence of the present invention.

Once user selects the desired musical work or clip to be used as the musical input for the user's musical message, the client device 101-105 transmits the selection over the wireless network 106 and/or network 110, which is received by the server 108 as the musical input at 208 of FIG. 2. At 210 of FIG. 2, the musical input is analyzed and processed in order to identify certain characteristics and patterns associated with the musical input so as to more effectively match the musical input with the text input to produce an original musical composition for use as the musical message. For example, in some embodiments, analysis and processing of the musical work includes "reducing" or "embellishing" the musical work. In some embodiments, the selected musical work is parsed for features such as structurally important notes, rhythmic signatures, and phrase boundaries. In embodiments that utilize a text or speech parser as described above, the results of the text or speech parsing may be factored into the analysis of the musical work as well. During analysis and processing, each musical work or clip can be optionally be embellished or reduced, either adding a number of notes to the phrase in a musical way (embellish), or removing them (reduce), while still maintaining the idea and recognition of the original melody. These embellishments or reductions are performed in order to align the textual phrases in the text input with the musical phrases by aligning their boundaries, and also to provide the musical material necessary for the alignment of the syllables of individual words to notes resulting in a natural musical expression of the input text. It is contemplated that, in some embodiments, all or part of the analysis of the pre-recorded musical works will have already been completed enabling the musical messaging system to merely retrieve the pre-analyzed data from the media database 109 for use in completing the musical composition. The process of analyzing the musical work in preparation for matching with the text input and for use in the musical message is set forth in more detail below.

Subsequently to the analysis of the musical input, at 212, the text input and the musical input are correlated with one another based on the analyses of both the text input and the musical input at 206 and 210. Specifically, in some embodiments, the notes of the selected and analyzed musical work are intelligently and automatically assigned to one or more phonemes in the input text, as described in more detail below. In some embodiments, the resulting data correlating the input text message to the musical input melody is then formatted into a synthesizer input at 214 for input into a voice synthesizer. The formatted synthesizer input, in the form of text syllable-melodic note pairs, are then sent to a voice synthesizer at 216 to create a vocal rendering of the text input for use in an original musical message that incorporates characteristics of the text input and the musical input. The musical message or vocal rendering is then received by the server 108 at 218. In some embodiments, the musical message is received in the form of an audio file including a vocal rendering of the text message entered by the user in the text input set to the music of the selected musical input. In some embodiments, the voice synthesizer can generate the entire musical message including the vocal rendering of the text input and the musical portion from the musical input. In other embodiments, the voice synthesizer may generate only a vocal rendering of the input text created based on the synthesizer input, which was generated by analyzing the text input and the musical input described above. In such embodiments, a musical rendering based on the musical input, or the musical input itself, can be combined with the vocal rendering to generate a musical message.

The voice synthesizer can be any suitable vocal renderer. In some embodiments, the voice synthesizer is cloud-based with support from a web server that provides security, load balancing, and the ability to accept inbound messages and send outbound musically-enhanced messages. In other embodiments, the vocal renderer is run locally on the server 108 itself or on the client device 101-105. In some embodiments, the voice synthesizer renders the formatted message data to provide a text-to-speech conversion as well as singing speech synthesis. In one embodiment, the vocal renderer may provide the user with a choice of a variety of voices, a variety of voice synthesizers (including but not limited to HMM-based, diphone or unit-selection based), or a choice of human languages. Some examples of the choices of singing voices are gender (e.g., male/female), age (e.g., young/old), nationality or accent (e.g., American accent/British accent), or other distinguishing vocal characteristics (e.g., sober/drunk, yelling/whispering, seductive, anxious, robotic, etc.). In some embodiments, these choices of voices are implemented through one or more speech synthesizers each using one or more vocal models, pitches, cadences, and other variables that result in perceptively different sung attributes. In some embodiments, the choice of voice synthesizer is made automatically by the system based on analysis of the text input and/or the musical input for specific words or musical styles indicating mood, tone, or genre. In certain embodiments, after the voice synthesizer generates the musical message, the system may provide harmonization to accompany the melody. Such accompaniment may be added into the message in the manner disclosed in pending U.S. Pat. No. 8,779,268, incorporated by reference above.

In some embodiments, the user has the option of adding graphical elements to the musical message at 219. If selected, graphical elements may be chosen from a library of pre-existing elements stored either at the media database 109, on the client device 101-105 itself, or both. In another embodiment, the user may create its own graphical element for inclusion in the musical text message. In yet other embodiments, graphic elements are generated automatically without the user needing to specifically select them. Some examples of graphics that could be generated for use with the musical message are colors and light flashes that correspond to the music in the musical message, animated figures or characters spelling out all or portions of textual message input by the user, or other animations or colors that are automatically determined to correspond with the tone of the selected musical work or with the tone of the text input itself as determined by analysis of the text input. If the user selects or creates a graphical element, a graphical input indicating this selection is transmitted to and received by the server 108 at 220. The graphical element is then generated at 222 using either the pre-existing elements selected by the user, automatic elements chosen by the system based on analysis of the text input and/or the musical input, or a graphical elements provided by the user.

In some embodiments, the user can choose, at 224, to include a video element with the musical message. If the user chooses to include a video element, the user interface can activate one or more cameras integrated into the client device 101-105 to capture video input, such as front-facing or rear-facing cameras on a smartphone or other device. The user can manipulate the user interface on the client device to record video inputs to be incorporated into the musical message. In some embodiments, the user interface displayed on the client device 101-105 can provide playback of the musical message while the user captures the video inputs so that the user can coordinate particular features of the video inputs with particular portions of the musical message. In one such embodiment, the user interface can display the text of the text input on the screen with a progress indicator moving across the text during playback so as to provide the user with a visual representation of the musical message's progress during video capture. In yet other embodiments, the user interface provides the user with the ability to stop and start video capture as desired throughout playback of the musical message, while simultaneously stopping playback of the musical message. One such way of providing this functionality is by capturing video while the user is touching a touchscreen or other input of the client device 101-105, and at least temporarily pausing video capture when the user releases the touchscreen or other input. In such embodiments, the system allows the user to capture certain portions of the video input during a first portion of the musical message, pause the video capture and playback of the musical message when desired, and then continue capture of another portion of the video input to correspond with a second portion of the musical message. After video capture is complete, the user interface provides the option of editing the video input by re-capturing portions of or the entirety of the video input.

In some embodiments, once capture and editing of the video input is complete, the video input is transmitted to and received by the server 108 for processing at 226. The video input can then be processed to generate a video element at 228, and the video element is then incorporated into the musical message. Once completed, the video element can be synced and played along with the musical message corresponding with the order in which the user captured the portions of the video input. In other embodiments, processing and video element generation can be completed on the client device 101-105 itself without the need to transmit video input to the server 108.

If the user chooses not to add any graphical or video elements to the musical message, or once the video and/or graphical elements are generated and incorporated into the musical message, the musical message is transmitted or outputted, at 230, to the client device 101-105 over the network 110 and/or wireless network 110. In embodiments where all or most of the described steps are executed on a single device, such as the client device 104, the musical message can be outputted to speakers and/or speakers combined with a visual display. At that point, in some embodiments, the system can provide the user with the option of previewing the musical message at 232. If the user chooses to preview the message, the musical message is played at 234 via the client device 101-105 for the user to review. In such embodiments, if the user is not satisfied with the musical message or would like to create an alternative message for whatever reason, the user is provided with the option to cancel the musical message without being sent or to edit the message. If, however, the user approves of the musical message or opts not to preview the musical message, the user can send the musical message to a selected message recipient at 235. As discussed above, the musical message can be sent to the one or more message recipients using a variety of communications and social media platforms, such as SMS or MMS messaging, e-mail, Facebook®, Twitter®, and Instagram®, so long as the messaging service/format supports the transmission, delivery, and playback of audio and/or video files.

The following provides a more detailed description of the methodology used in analyzing and processing the text input and musical input provided by the user to create a musical message. Specifically, the details provided pertain to at least one embodiment of performing steps 206 and 210-214 of the method 200 for operating the musical messaging system 100 illustrated in FIG. 2. It should be understood, however, that other alternative methodologies for carrying out the steps of FIG. 2 are contemplated herein. It should also be understood that the musical messaging system can perform the following operations automatically upon receiving a text input and selection of musical input from a user via the user's client device. It should further be understood that the methodology disclosed herein provides technical solutions to technical problems associated with correlating textual inputs with musical inputs such that the musical output of the correlation of the two inputs is matched effectively. Further, the methods and features described herein can operate to improve the functional ability of the computer or server to process certain types of information in a way that makes the computer more usable and functional than would otherwise be possible without the operations and systems described herein.

The musical messaging system gathers and manipulates text and musical inputs in such a way to assure system flexibility, scalability, and effectiveness. In some embodiments, collection and analysis of data points relating to the text input and musical input is implemented to improve the computer and the system's ability to effectively correlate the musical and text inputs. Some data points determined and used by the system in analyzing and processing a text input, such as in step 206 of FIG. 2, is the number of characters, or character count ("CC"), and the number of words, or word count ("WC") included in the text input. Any suitable method can be used to determine the CC and WC. For example, in some embodiments the system determines WC by counting spaces between groups of characters, or by recognizing words in groups of characters by reference to a database of known words in a particular language or selection of languages. Other data points determined by the system during analysis of the text input are the number of syllables, or syllable count ("TC") and the number of sentences, or sentence count ("SC"). TC and SC can be determined in any suitable manner, for example, by analyzing punctuation and spacing for SC, or parsing words into syllables by reference to a word database stored in the media database 109 or elsewhere. Upon receipt of the text input supplied by a user via the client device 101-105, the system analyzes and parses the input text to determine values such as the CC, WC, TC, and SC. In some embodiments, this parsing is conducted at the server 108, but it is also contemplated that, in some embodiments, parsing of the input text is conducted on the client device 101-105. In certain embodiments, during analysis, the system inserts coded start flags and end flags at the beginning and end of each word, syllable, and sentence to mark the determination made during analysis. The location of a start flag at the beginning of a sentence, for example, can be referred to as the sentence start ("SS"), and the location of the end flag at the end of a sentence can be referred to as the sentence end ("SE"). Additionally, it is contemplated that, during analysis, words or syllables of the text input can be flagged for a textual emphasis. The system methodology for recognizing such instances in which words or syllables should receive textual emphasis can be based on language or be culturally specific.

In some embodiments, another analysis conducted by the system on the input text is determining the phrase class ("PC") of each of the CC and the WC. The phrase class of the character count will be referred to as the CCPC and the phrase class of the word count will be referred to as the WCPC. The value of the phrase class is a sequentially indexed set of groups that represent increasing sets of values of CC or WC. For example, a text input with CC of 0 could have a CCPC of 1, and a text input with a WC of 0 could be have a WCPC of 1. Further, a text input with a CC of between 1 and 6 could have a CCPC of 2, and a text input with a WC of 1 could have a WCPC of 2. The CCPC and WCPC could then increase sequentially as the CC or the WC increases, respectively.

Below, Table 1 illustrates, for exemplary and non-limiting purposes only, a possible classification of CCPC and WCPC based on CC and WC in a text input.

TABLE 1

| PC | CC | WC | Description |
|---|---|---|---|
| 1 | 0 | 0 | No Text Input |
| 2 | 1-6 | 1 | One Word |
| 3 | 7-9 | 2-3 | Extremely Short |
| 4 | 10-25 | 4-8 | Short |
| 5 | 25-75 | 9-15 | Medium |
| 6 | 75-125 | 15-20 | Long |
| 7 | 125+ | 20+ | Extremely Long |

Based on the CCPC and WCPC, the system can determine an overall phrase class for the entire text input by the user, or the user phrase class ("UPC"). This determination could be made by giving different weights to different values of CCPC and WCPC, respectively. In some embodiments, greater weight is given to the WCPC than the CCPC in determining the UPC, but it should be understood that other or equal weights can also be used. One example gives the CCPC a 40% weight and the WCPC a 60% weight, as represented by the following equation:

$$UPC=0.4(CCPC)+0.6(WCPC) \qquad \text{EQ. 1}$$

Thus, based on the exemplary Table 1 of phrase classes and exemplary equation 1 above, a text input with a CC of 27 and a WC of 3 would have a CCPC of 5 and a WCPC of 3, resulting in a UPC of 3.8 as follows:

$$UPC=0.4(5)+0.6(3)=3.8 \qquad \text{EQ. 2}$$

It should be noted that the phrase class system and weighting system explained herein can is variable based on several factors related to the selected musical input such as mood, genre, style, etc., or other factors related to the text input, such as important words or phrases as determined during analysis of the text input.

In an analogous manner, the musical input selected or provided by the user can be parsed during analysis and processing, such as in step 210 of FIG. 2. In some embodiments, the system parses the musical input selected or provided by the user to determine a variety of data points. One data point determined in the analysis is the number of notes, or note count ("NC") in the particular musical input.

Another product of the analysis done on the musical input includes determining the start and end of musical phrases throughout the musical input. A musical phrase is analogous to a linguistic sentence in that a musical phrase is a grouping of musical notes that conveys a musical thought. Thus, in some embodiments, the analysis and processing of the selected musical input involves flagging the beginnings and endings of each identified musical phrase in a musical input. Analogously to the phrase class of the of the text input (UPC) described above, a phrase class of the source musical input, referred to as source phrase class ("SPC") can be determined, for example, based on the number of musical phrases and note count identified in the musical input.

The beginning of each musical phrase can be referred to as the phrase start ("PS"), and the ending of each musical phrase can be referred to as the phrase end ("PE"). The PS and the PE in the musical input is analogous to the sentence start (SS) and sentence end (SE) in the text input. In some embodiments, the PS and PE associated with the musical works pre-recorded and stored on the server 108 or the client device 101-105 and available for selection by the user as a musical input can be predetermined. In such embodiments, the locations of PS and PE for the musical input are pre-determined and analysis of the musical input involves retrieving such information from a store location, such as the media database 109. In other embodiments, however, or in embodiments where the musical input is provided by the user and not pre-recorded and stored, further analysis is conducted to distinguish musical phrases in the musical input and, thus, determine the corresponding PS and PE for each identified musical phrase.

In some embodiments, the phrase classes of the text input and the musical input are compared to determine the parity or disparity between the two inputs. It should be understood that, although the disclosure describes comparing corresponding text inputs and musical inputs using phrase classes, other methodologies for making comparisons between text inputs and musical inputs are contemplated herein. The phrase class comparison can take place upon correlating the musical input with the text input based on the respective analyses, such as at step 212 of FIG. 2.

In certain embodiments, parity between a text input and a musical input is analyzed by determining the phrase differential ("PD") between corresponding text inputs and musical inputs provided by the user. One example of determining the PD is by dividing the user phrase class (UPC) by the source phrase class (SPC), as shown in Equation 3, below:

$$PD=UPC/SPC \qquad \text{EQ. 3}$$

In this example, perfect phrase parity between the text input and the musical input would result in a PD of 1.0, where the UPC and the SPC are equal. If the text input is "shorter" than the musical input, the PD has a value less than 1.0, and if the text input is "longer" than the musical input, the PD has a value of greater than 1.0. Those with skill in the art will recognize that similar results could be obtained by dividing the SPC by the UPC, or with other suitable comparison methods.

Parity between the text input and the musical input can also be determined by the "note" differential ("ND") between the text input and the musical input provided by the user. One example of determining the ND is by taking the difference between the note count (NC) and the analogous syllable count (TC) of the text input. For example:

$$ND=NC-TC \qquad \text{EQ. 4}$$

In this example, perfect phrase parity between the text input and the musical input would be an ND of 0, where the NC and the TC are equal. If the text input is "shorter" than the musical input, the ND would be greater than or equal to 1, and if the text input is "longer" than the musical input, the ND would be less than or equal to −1. Those with skill in the art will recognize that similar results could be obtained by subtracting the NC from the TC, or with other suitable comparison methods.

Using these or suitable alternative comparison methods establishes how suitable a given text input is for a provided or selected musical input. Phrase parity of PD=1 and ND=0 represents a high level of parity between the two inputs, where PD that is much greater or less than 1 or ND that is much greater or less than zero represents a low level of parity, i.e., disparity. In some embodiments, when correlating the musical input and the text input to create a musical message, the sentence starts (SS) and sentence ends (SE) of the textual input would ideally align with the phrase starts (PS) and phrase ends (PE), respectively, of the musical input if the parity is perfect or close to perfect (i.e., high parity). However, when parity is imperfect, the SE and the PE may not align well when the SS and the PS are set aligned to one another. Based on the level of parity/disparity determined during analysis, various methods of processing the musical input and the text input can be utilized to provide an optimal outcome for the musical message.

One example of a solution to correlate text and musical inputs is syllabic matching. When parity is perfect, i.e., note differential (ND) is zero, the note count (NC) and the syllable count (TC) are equal or the phrase differential (PD) is 1.0, syllabic matching can involve simply matching the syllables in the text input to the notes in the musical input and/or matching the text input sentences to the musical input musical phrases.

In some embodiments, however, if PD is slightly greater than or less than to 1.0 and/or ND is between, for example, 1 and 5 or −1 and −5, melodic reduction or embellishment, respectively, can be used to provide correlation between the inputs. Melodic reduction involves reducing the number of notes played in the musical input and can be used when the NC is slightly greater than the TC (e.g., ND is between approximately 1 and 5) or the musical source phrase class (SPC) is slightly greater than the user phrase class (UPC) (e.g., PD is slightly less than 1.0). Reducing the notes in the musical input can shorten the overall length of the musical input and result in the NC being closer to or equal to the TC of the text input, increasing the phrase parity. The fewer notes that are removed from the musical input, the less impact the reduction will have on the musical work selected as the musical input and, therefore, the more recognizable the musical element of the musical message will be upon completion. Similarly, melodic embellishment involves adding notes to (i.e., "embellishing") the musical input. In some embodiments, melodic embellishment is used when the NC is slightly less than the TC (e.g., ND is between −1 and −5) or the SPC is slightly less than the UPC (e.g., PD is slightly greater than 1.0). Adding notes in the musical input can lengthen the musical input, which can add to the NC or SPC and, thus, increase the parity between the inputs. The fewer notes that are added using melodic embellishment, the less impact the embellishment will have on the musical work selected as the musical input and, therefore, the more recognizable the musical element of the musical message will be upon completion. In some embodiments, the additional notes added to the musical work are determined by analyzing the original notes in the musical work and adding notes that make sense musically. For example, in some embodiments, the system may only add notes in the same musical key as the original musical work, or notes that maintain the tempo or other features of the original work so as to aide in keeping the musical work recognizable. It should be understood that although melodic reduction and embellishment have been described in the context of slight phrase disparity between the musical and text inputs, use of melodic reduction and embellishment in larger or smaller phrase disparity is also contemplated.

Another solution to resolving disparity between the musical input and the text input is stutter effects. In some embodiments, stutter effects can be used to address medium parity differentials—e.g., a PD between approximately 0.75 and 1.5. Stutter effects involve cutting and repeating relatively short bits of a musical or vocal work in relatively quick succession. Stutter effects can be applied to either the musical input or to the text input in the form of vocal stutter effects in order to lengthen one or the other input to more closely match the corresponding musical or text input. For example, if a musical input is shorter than a corresponding text input (e.g., PD is approximately 1.5), the musical input could be lengthened by repeating a small portion or portions of the musical input in quick succession. A similar process could be used with the text input, repeating one or more syllables of the text input in relatively quick succession to lengthen the text input. As a result of the stutter effects, the phrase differential between the musical input and the text input can be brought closer to the optimal level. It should be understood that although stutter effects have been described in the context of medium phrase disparity between the musical and text inputs, use of stutter effects in larger or smaller phrase disparity is also contemplated.

Other solutions to resolving disparity between the musical input and the text input are repetition and melisma. In some embodiments, repetition and melisma are used to resolve relatively large phrase differentials between musical and text inputs—e.g., a PC less than 0.5 or greater than 2.0. Repetition includes repeating either the text input or the musical input more than once while playing the corresponding musical or text input a single time. For example, if the PD is 0.5, this would indicate that musical input is twice as long as the text input. In such a scenario, the text input could simply be repeated once (i.e., played twice), to substantially match the length of the musical input. Similarly, a PD of 2.0 would indicate that that the text input is substantially twice as long as the musical input. In such a scenario, the musical input could be looped to play twice to correlate with the single playback of the longer text input.

Melisma is another solution that can be used to resolve disparity between musical inputs and corresponding text inputs. In some embodiments, melisma is used when the text input is shorter than the musical input to make the text input more closely match with the musical input. Specifically, melisma occurs when a single syllable from the text input is stretched over multiple notes of the musical input. For example, if the syllable count (TC) is 12 and the note count (NC) is 13, the system can assign one syllable from the text input to be played or "sung" over two notes in the musical input. Melisma can be applied over a plurality of separate syllables throughout the text input, such as at the beginning, middle, and end of the musical input. In some embodiments, the system can choose which words or syllables to which a melisma should be applied based on analysis of the words in the text input and/or based on the tone or mood of the musical work chosen as the musical input.

Another solution to the disparity between text input and musical input is recognizing leitmotifs in the musical input. One skilled in the art would recognize that leitmotifs are relatively smaller elements of a musical phrase that still include some "sameness" that can be discerned by the listener. The "sameness" can be a combination of similar or same rhythms and musical intervals repeated throughout a musical phrase. For example, a leitmotif can be a grouping of notes within a musical phrase that follows similar note patterns or note rhythms, and these leitmotifs can be recognized by the system during analysis or can be pre-determined for pre-recorded musical works. In either case, leitmotif locations throughout a musical input can be noted and marked. In some embodiments, leitmotifs can then be used as prioritized targets for textual emphasis or repetition when analyzing the musical input to resolve disparity between the musical input and the text input.

It will be understood by those skilled in the art that, in certain embodiments, the musical messaging system can use any of the individual solutions alone while correlating the musical input with the text input, or can implement various solutions described herein sequentially or simultaneously to optimize the output quality of a musical message. For example, the system could use embellishment to lengthen a musical input so that it becomes half the length of the text input, followed by using repetition of the embellished musical input to more closely match up with the text input. Other combinations of solutions are also contemplated herein to accomplish the task of correlating the musical input with the text input so that the finalized musical message is optimized. It is also contemplated that other techniques consistent with this disclosure could be implemented to effectively correlate the musical input with the text input in transforming the text input and musical input into a finalized musical message.

One skilled in the art would understand that the musical messaging system and the method for operating such musical messaging system described herein could be performed on a single client device, such as client device 104 or server 108, or could be performed on a variety of devices, each device including different portions of the system and performing different portions of the method. For example, in some embodiments, the client device 104 or server 108 could perform most of the steps illustrated in FIG. 2, but the voice synthesis could be performed by another device or another server. The following includes a description of one embodiment of a single device that could be configured to include the musical messaging system described herein, but it should be understood that the single device could alternatively be multiple devices.

Figure 4:
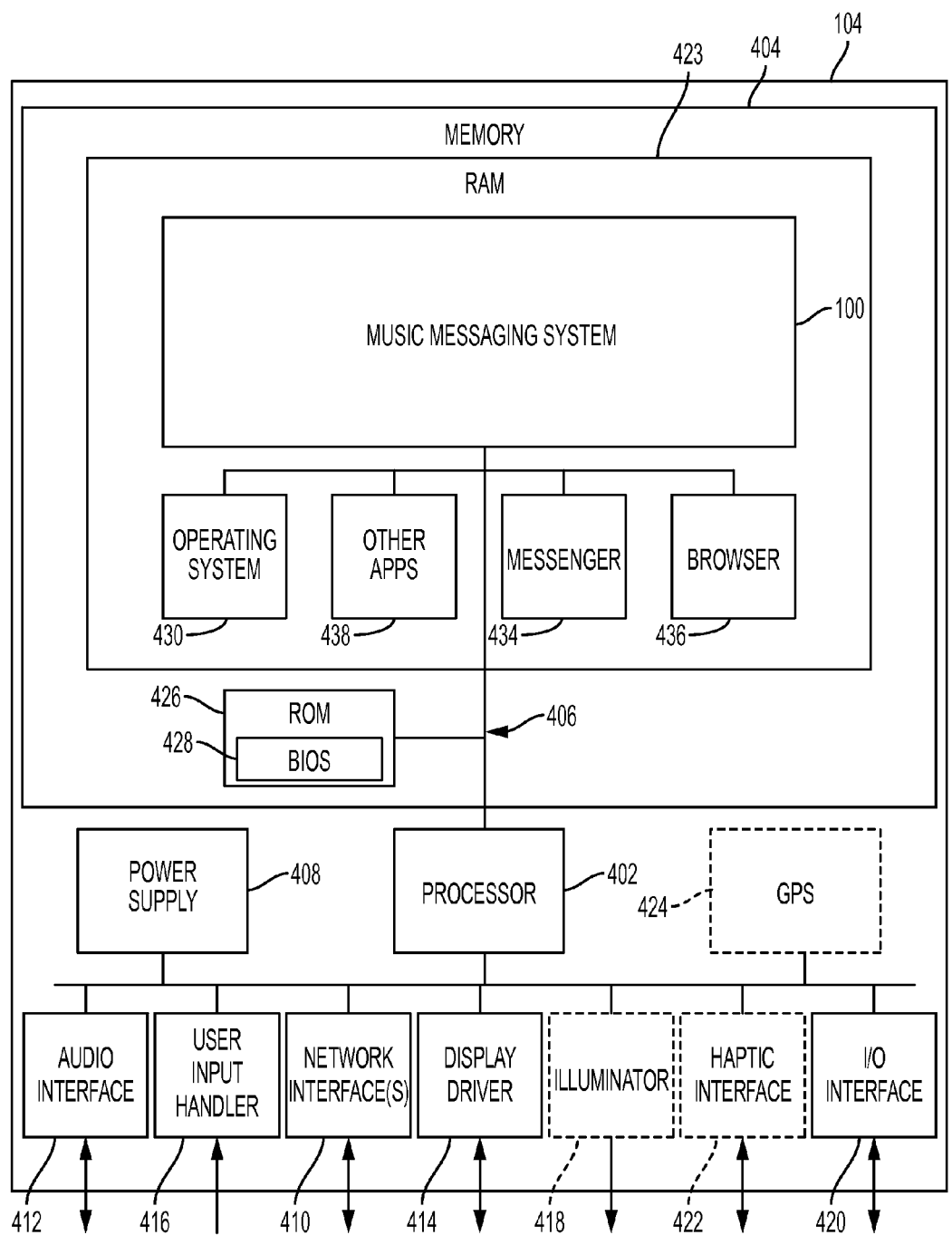
FIG. 4 illustrates a block diagram of a device that supports the systems and processes of the disclosure.

FIG. 4 shows one embodiment of the system 100 that may be deployed on any of a variety of devices 101-105 or 108 from FIG. 1, or on a plurality of devices working together, which may be, for illustrative purposes, any multi-purpose computer (101, 102), hand-held computing device (103-105) and/or server (108). For the purposes of illustration, FIG. 4 depicts the system 100 operating on device 104 from FIG. 1, but one skilled in the art would understand that the system 100 may be deployed either as an application installed on a single device or, alternatively, on a plurality of devices that each perform a portion of the system's operation. Alternatively, the system may be operated within an http browser environment, which may optionally utilize web-plug in technology to expand the functionality of the browser to enable functionality associated with system 100. Device 104 may include many more or less components than those shown in FIG. 4. However, it should be understood by those of ordinary skill in the art that certain components are not necessary to operate system 100, while others, such as processor, video display, and audio speaker are important to practice aspects of the present invention.

As shown in FIG. 4, device 104 includes a processor 402, which may be a CPU, in communication with a mass memory 404 via a bus 406. As would be understood by those of ordinary skill in the art having the present specification, drawings and claims before them, processor 402 could also comprise one or more general processors, digital signal processors, other specialized processors and/or ASICs, alone or in combination with one another. Device 104 also includes a power supply 408, one or more network interfaces 410, an audio interface 412, a display driver 414, a user input handler 416, an illuminator 418, an input/output interface 420, an optional haptic interface 422, and an optional global positioning systems (GPS) receiver 424. Device 104 may also include a camera, enabling video to be acquired and/or associated with a particular musical message. Video from the camera, or other source, may also further be provided to an online social network and/or an online music community. Device 104 may also optionally communicate with a base station or server 108 from FIG. 1, or directly with another computing device. Other computing device, such as the base station or server 108 from FIG. 1, may include additional audio-related components, such as a professional audio processor, generator, amplifier, speaker, XLR connectors and/or power supply.

Continuing with FIG. 4, power supply 408 may comprise a rechargeable or non-rechargeable battery or may be provided by an external power source, such as an AC adapter or a powered docking cradle that could also supplement and/or recharge the battery. Network interface 410 includes circuitry for coupling device 104 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Accordingly, network interface 410 may include as a transceiver, transceiving device, or network interface card (NIC).

Audio interface 412 (FIG. 4) is arranged to produce and receive audio signals such as the sound of a human voice. Display driver 414 (FIG. 4) is arranged to produce video signals to drive various types of displays. For example, display driver 414 may drive a video monitor display, which may be a liquid crystal, gas plasma, or light emitting diode (LED) based-display, or any other type of display that may be used with a computing device. Display driver 414 may alternatively drive a hand-held, touch sensitive screen, which would also be arranged to receive input from an object such as a stylus or a digit from a human hand via user input handler 416.

Device 104 also comprises input/output interface 420 for communicating with external devices, such as a headset, a speaker, or other input or output devices. Input/output interface 420 may utilize one or more communication technologies, such as USB, infrared, Bluetooth™, or the like. The optional haptic interface 422 is arranged to provide tactile feedback to a user of device 104. For example, in an embodiment, such as that shown in FIG. 1, where the device 104 is a mobile or handheld device, the optional haptic interface 422 may be employed to vibrate the device in a particular way such as, for example, when another user of a computing device is calling.

Optional GPS transceiver 424 may determine the physical coordinates of device 100 on the surface of the Earth, which typically outputs a location as latitude and longitude values. GPS transceiver 424 can also employ other geo-positioning mechanisms, including, but not limited to, triangulation, assisted GPS (AGPS), E-OTD, CI, SAI, ETA, BSS or the like, to further determine the physical location of device 104 on the surface of the Earth. In one embodiment, however, mobile device may, through other components, provide other information that may be employed to determine a physical location of the device, including for example, a MAC address, IP address, or the like.

As shown in FIG. 4, mass memory 404 includes a RAM 423, a ROM 426, and other storage means. Mass memory 404 illustrates an example of computer readable storage media for storage of information such as computer readable instructions, data structures, program modules, or other data. Mass memory 404 stores a basic input/output system ("BIOS") 428 for controlling low-level operation of device 104. The mass memory also stores an operating system 430 for controlling the operation of device 104. It will be appreciated that this component may include a general purpose operating system such as a version of MAC OS, WINDOWS, UNIX, LINUX, or a specialized operating system such as, for example, Xbox 360 system software, Wii IOS, Windows Mobile™, iOS, Android, webOS, QNX, or the Symbian® operating systems. The operating system may include, or interface with, a Java virtual machine module that enables control of hardware components and/or operating system operations via Java application programs. The operating system may also include a secure virtual container, also generally referred to as a "sandbox," that enables secure execution of applications, for example, Flash and Unity.

One or more data storage modules may be stored in memory 404 of device 104. As would be understood by those of ordinary skill in the art having the present specification, drawings, and claims before them, a portion of the information stored in data storage modules may also be stored on a disk drive or other storage medium associated with device 104. These data storage modules may store multiple track recordings, MIDI files, WAV files, samples of audio data, and a variety of other data and/or data formats or input melody data in any of the formats discussed above. Data storage modules may also store information that describes various capabilities of system 100, which may be sent to other devices, for instance as part of a header during a communication, upon request or in response to certain events, or the like. Moreover, data storage modules may also be employed to store social networking information including address books, buddy lists, aliases, user profile information, or the like.

Device 104 may store and selectively execute a number of different applications, including applications for use in accordance with system 100. For example, application for use in accordance with system 100 may include Audio Converter Module, Recording Session Live Looping (RSLL) Module, Multiple Take Auto-Compositor (MTAC) Module, Harmonizer Module, Track Sharer Module, Sound Searcher Module, Genre Matcher Module, and Chord Matcher Module. The functions of these applications are described in more detail in U.S. Pat. No. 8,779,268, which has been incorporated by reference above.

The applications on device 104 may also include a messenger 434 and browser 436. Messenger 434 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 434 may be configured as an IM messaging application, such as AOL Instant Messenger, Yahoo! Messenger, .NET Messenger Server, ICQ, or the like. In another embodiment, messenger 434 may be a client application that is configured to integrate and employ a variety of messaging protocols. In one embodiment, messenger 434 may interact with browser 436 for managing messages. Browser 436 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages, including Python, Java, and third party web plug-ins, may be employed.

Device 104 may also include other applications 438, such as computer executable instructions which, when executed by client device 104, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VoIP applications, contact managers, task managers, transcoders, database programs, word processing programs, security applications, spreadsheet programs, games, search programs, and so forth. Each of the applications described above may be embedded or, alternately, downloaded and executed on device 104.

Of course, while the various applications discussed above are shown as being implemented on device 104, in alternate embodiments, one or more portions of each of these applications may be implemented on one or more remote devices or servers, wherein inputs and outputs of each portion are passed between device 104 and the one or more remote devices or servers over one or more networks. Alternately, one or more of the applications may be packaged for execution on, or downloaded from a peripheral device.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A computer implemented method for automatically converting textual messages to musical messages, the computer implemented method comprising:
   receiving a text input;
   receiving a musical input selection;
   analyzing, via one or more processors, the text input to determine at least one text characteristic including at least one of a word count or a syllable count of the text input;
   determining, via the one or more processors, a user phrase class for the text input based on at least one of the word count or the syllable count of the text input;
   analyzing, via the one or more processors, a musical input corresponding to the musical input selection to determine at least one musical characteristic including at least one of a musical phrase or a note count of the musical input;
   determining, via the one or more processors, a source phrase class for the musical input based on at least one of the musical phrase or the note count of the musical input;
   comparing, via the one or more processors, the user phrase class to the source phrase class to determine a phrase differential;
   based on the phrase differential, correlating, via the one or more processors, the text input with the musical input to generate a synthesizer input;
   sending the synthesizer input to a voice synthesizer;
   receiving, from the voice synthesizer, a vocal rendering of the text input;
   generating a musical message from the vocal rendering of the text input and the musical input; and
   outputting the musical message.

2. The method of claim 1, wherein receiving the text input further comprises receiving the text input from a client device via a digital communications network.

3. The method of claim 1, wherein outputting the musical message further comprises sending the musical message to a client device via a digital communications network.

4. The method of claim 1, wherein the at least one text characteristic is a syllable count and the at least one musical characteristic is a note count.

5. The method of claim 4, further comprising comparing the syllable count of the text input to the note count of the musical input to determine a note differential.

6. The method of claim 5, wherein correlating the text input with the musical input further comprises generating the synthesizer input at least partially based on the note differential.

7. The method of claim 1, wherein the user phrase class is a first numerical value and the source phrase class is a second numerical value.

8. The method of claim 7, wherein the phrase differential is a ratio of the first numerical value and the second numerical value.

9. An apparatus comprising:
   at least one processor; and
   at least one memory storing computer readable instructions that, when executed, cause the apparatus at least to perform:
      receiving a text input;
      receiving a musical input selection;
      analyzing, via the at least one processor, the text input to determine at least one text characteristic including at least one of a word count or a syllable count of the text input;
      determining, via the one or more processors, a user phrase class for the text input based on at least one of the word count or the syllable count of the text input;
      analyzing, via the at least one processor, a musical input corresponding to the musical input selection to determine at least one musical characteristic including at least one of a musical phrase or a note count of the musical input;
      determining, via the one or more processors, a source phrase class for he musical input based on at least one of the musical phrase or the note count of the musical input;
      comparing, via the one or more processors, the user phrase class to the source phrase class to determine a phrase differential;
      based on the phrase differential, correlating, via the at least one processor, the text input with the musical input to generate a synthesizer input;
      sending the synthesizer input to a voice synthesizer;
      receiving, from the voice synthesizer, a vocal rendering of the text input;
      generating a musical message from the vocal rendering of the text input and the musical input; and
      outputting the musical message.

10. The apparatus of claim 9, wherein receiving the text input further comprises receiving the text input from a client device via a digital communications network.

11. The apparatus of claim 9, wherein outputting the musical message further comprises sending the musical message to a client device via a digital communications network.

12. The apparatus of claim 9, wherein the at least one text characteristic is a syllable count and the at least one musical characteristic is a note count, and wherein the at least one memory storing computer readable instructions cause the apparatus further perform comparing the syllable count of the text input to the note count of the musical input to determine a note differential.

13. The apparatus of claim 12, wherein correlating the text input with the musical input further comprises generating the synthesizer input at least partially based on the note differential.

14. The apparatus of claim 9, wherein the user phrase class is a first numerical value and the source phrase class is a second numerical value.

15. A non-transitory computer readable medium storing instructions that, when executed, cause an apparatus at least to perform:
   receiving a text input;
   receiving a musical input selection;
   analyzing, via one or more processors, the text input to determine at least one text characteristic including at least one of a word count or a syllable count of the text input;
   determining, via the one or more processors, a user phrase class for the text input based on at least one of the word count or the syllable count of the text input;
   analyzing, via the one or more processors, a musical input corresponding to the musical input selection to determine at least one musical characteristic including at least one of a musical phrase or a note count of the musical input;
   determining via the one or more processors, a source phrase class for the musical input based on at least one of the musical phrase or the note count of the musical input;

comparing, via the one or more processors, the user phrase class to the source phrase class to determine a phrase differential;

based on the phrase differential, correlating, via the one or more processors, the text input with the musical input to generate a synthesizer input;

sending the synthesizer input to a voice synthesizer;

receiving, from the voice synthesizer, a vocal rendering of the text input;

generating a musical message from the vocal rendering of the text input and the musical input; and outputting the musical message.

16. The non-transitory computer readable medium of claim 15, wherein receiving the text input further comprises receiving the text input from a client device via a digital communications network, and wherein outputting the musical message further comprises sending the musical message to a client device via the digital communications network.

17. The non-transitory computer readable medium of claim 15, wherein the at least one text characteristic is a syllable count and the at least one musical characteristic is a note count, and wherein the instructions, when executed, cause an apparatus to further perform:

comparing the syllable count of the text input to the note count of the musical input to determine a note differential; and generating the synthesizer input at least partially based on the note differential.

18. The non-transitory computer readable medium of claim 15, wherein the user phrase class is a first numerical value and the source class is a second numerical value, and wherein the phrase differential is a ratio of the first numerical value and the second numerical value.

* * * * *